3,250,781
WOOD'S METAL AS A POLYMERIZATION INHIBITOR IN THE TRANSESTERIFICATION OF ACRYLATE ESTERS
Werner S. Zimmt, Wynnewood, Pa., assignor to E. I. du Pont de Nemours and Company, Wilmington, Del., a corporation of Delaware
No Drawing. Filed Nov. 1, 1963, Ser. No. 320,926
4 Claims. (Cl. 260—307)

This invention relates to an improved process for the preparation of compounds having the formula (1)
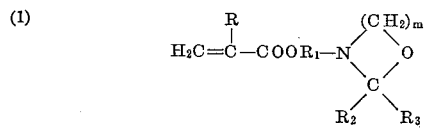

where R can be hydrogen or methyl, $R_1$ can be an alkylene radical of 1 through 5 carbon atoms, $R_2$ can be hydrogen or methyl, $R_3$ can be hydrogen or an alkyl group of 1 through 4 carbon atoms, $m$ is 2 or 3, and $R_2$ and $R_3$ can be linked together to form a tetramethylene or pentamethylene bridge.

The invention is more particularly directed to an improved process for the preparation of these compounds by transesterifying a compound of the formula (2)

where R is as disclosed in Formula 1 and $R_4$ is an alkyl group of 1 through 12 carbon atoms with a compound of the formula (3)
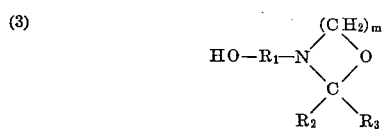

where R, $R_1$, $R_2$, $R_3$ and $m$ are defined as in Formula 1.

The compounds of Formula 1 can be polymerized to form polymers which are useful for imparting wet strength to paper, as flocculating agents, as oil additives and as pour-point depressants. All this is disclosed in greater detail in U.S. Patent 3,037,006.

The transesterification process is also described in U.S. Patent 3,037,006. But this process, as disclosed in the patent, has not proved entirely satisfactory in several respects. First, to prevent excessive polymerization of the monomeric reactants, it is necessary, during the transesterification step, to load the reaction mass with inhibitors. This requires the product to be subsequently distilled from the inhibitors if a product sufficiently pure for commercial use is desired.

Secondly, the products are not entirely stable and have a tendency to gel after a few days storage.

Third, the process, as shown in the examples of U.S. Patent 3,037,006, provides no more than about a 50% yield, based on the alcohol.

It has now been found that these disadvantages can be overcome by running the transesterification reaction in the presence of about 5 to 20% of Wood's metal and in an atmosphere of a gas which is inert to the reaction, such as nitrogen, argon or helium, and by limiting the reaction time to 150 minutes or less.

This permits the reaction to be conducted with little or no polymerization inhibitor present. The final product can consequently be used directly in polymerization procedures without preliminary purification. Moreover, the yield in most cases is boosted to in excess of 95%, and the product can be stored many months without deterioration.

In addition, limiting the reaction period to 150 minutes or less minimizes formation of undesirable by-products which, if present in the monomer product, cause crosslinking and gel formation when it is polymerized.

The process of the invention is carried out basically as described in U.S. Patent 3,037,006. According to this method, one reacts an acrylate or methacrylate ester of Formula 2 with an oxazolidine or tetrahydrooxazine of Formula 3 at reflux temperature in the presence of Wood's metal and in an inert atmosphere while continuously taking off an acrylate or methacrylate ester-methanol azeotrope. It is important that the ester-methanol azeotrope be removed from the reaction mass as quickly as possible once azeotropic conditions have been established.

The reactants are ordinarily brought together in such proportions that the acrylate or methacrylate ester is present in a ten-fold molar excess.

The reaction is run at a temperature of from about 80° C. to about 130° C. for a maximum of 150 minutes. The precise time and temperature will of course depend upon the particular reactants being used.

It is desirable that a transesterification catalyst be used to promote the reaction. Conventional transesterification catalysts are satisfactory. Dibutyl tin oxide is a particularly efficient catalyst for this reaction. The catalysts are used at concentrations of from 0.1% to 3% by weight of the total charge.

The resulting monomeric product can be polymerized directly by adding a suitable initiator such as azobisisobutyronitrile and such other monomers and solvents as may appear to be desirable. Polymerization is accomplished by conventional means.

This invention will be more readily understood and more easily practiced by referring to the following illustrative examples:

*Example 1*

A reaction vessel equipped with a stirrer and a fractionating column is charged with 450 parts of methyl methacrylate, 2 parts of dibutyl tin oxide, 2 parts of p-anilinophenol and 100 parts of Wood's metal.

This mixture is brought to reflux temperature, with vigorous stirring, and small amounts of water and methyl methacrylate are then distilled off. Fifty parts of 3-($\beta$-hydroxyethyl)-2,2-spirocyclohexyloxazolidine are then rapidly added to the reaction mixture, which is kept at reflux temperature for 15 minutes.

At the end of this period, the temperature at the head of the distillation column has dropped to 65° C. Removal of the methanol-methyl methacrylate azeotrope is continued for 15 to 20 minutes, or until the temperature at the head of the distillation column begins to rise. The rate of takeoff is then increased and the rest of the methanol is removed together with some of the methyl methacrylate.

The reaction is essentially complete in about one hour. The reaction mixture is then cooled and decanted from the solidified Wood's metal. This liquid product is ready for direct polymerization, or can be stored at room temperature until needed.

The polymerization can be carried out by adding an equal volume of toluene and 0.5% of azobisisobutyronitrile and heating at conventional temperatures.

*Example 2*

The compound 3-($\beta$-methacryloxyethyl)-2,2-dimethyloxazolidine can be prepared in a fashion similar to that shown in Example 1, in equal yield, by substituting 3-($\beta$-hydroxyethyl)-2,2-dimethyloxazolidine for 3-($\beta$-hydroxyethyl) - 2,2 - spirocyclohexyloxazolidine, in equivalent amounts.

The resulting reaction product can be similarly polymerized directly.

The reaction products of Examples 1 and 2 are tested for the presence of polymer by taking 2 ml. of product and dropping it into 25 ml. of methanol in a 25 ml. graduate. No polymer precipitates, nor does the methanol become hazy. As little as 1% of polymer in the reaction mass can be detected by this method.

The claims are:

1. A process for the preparation of compounds having the formula

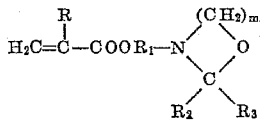

where

R is selected from the group consisting of hydrogen and methyl, $R_1$ is an alkylene radical of 1 through 5 carbon atoms, $R_2$ is selected from the group consisting of hydrogen and methyl, $R_3$ is selected from the group consisting of hydrogen and alkyl radicals of 1 through 4 carbon atoms, $m$ is a whole integer having a value of 2 to 3, and $R_2$ and $R_3$ can be linked together to form an alkylene bridge of 5 to 6 carbon atoms, said process comprising reacting a compound of the formula

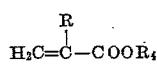

where

R is as defined above and $R_4$ is an alkyl group of 1 through 12 carbon atoms, with a compound of the formula

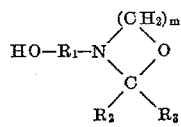

where $R_1$, $R_2$ and $R_3$ are defined as above, at a temperature of from 80° C. to 130° C., in an inert atmosphere while intimately contacting the reaction mass with Wood's metal as the reaction is taking place, said reaction proceeding for no longer than 150 minutes.

2. The process of claim 1 wherein 3-(β-methacryloxyethyl)-2,2-spirocyclohexyloxazolidine is prepared by reacting 3-(β-hydroxyethyl)-2,2-spirocyclohexyloxazolidine with methyl methacrylate.

3. In a process for the preparation of a compound having the formula

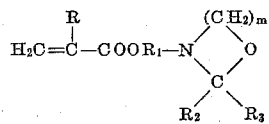

where

R is selected from the group consisting of hydrogen and methyl, $R_1$ is an alkylene radical of 1 through 5 carbon atoms, $R_2$ is selected from the group consisting of hydrogen and methyl, $R_3$ is selected from the group consisting of hydrogen and alkyl radicals of 1 through 4 carbon atoms, and $m$ is an integer having a value of 2 to 3, and $R_2$ and $R_3$ can be linked together to form an alkylene bridge of 5 to 6 carbon atoms, said process comprising reacting a compound of the formula

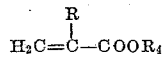

where R is as defined above and $R_4$ is an alkyl group of 1 through 12 carbon atoms, with a compound of the formula

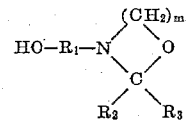

where $R_1$, $R_2$ and $R_3$ are defined as above, at a temperature of from 80° C. to 130° C., the improvement comprising conducting said reaction in an inert atmosphere while intimately contacting the reaction mass with Wood's metal as the reaction is taking place, said reaction proceeding for no longer than 150 minutes.

4. The process of claim 3 wherein 3-(β-methacryloxyethyl)-2,2-spirocyclohexyloxazolidine is prepared by reacting 3-(β-hydroxyethyl)-2,2-spirocyclohexyloxazolidine with methyl methacrylate.

References Cited by the Examiner

UNITED STATES PATENTS 2,858,255  10/1958  Segui et al. _____ 260—486
3,037,006   5/1962  Hankins et al. _____ 260—80.5

NICHOLAS S. RIZZO, *Primary Examiner.*

HENRY R. JILES, *Examiner.*

RICHARD J. GALLAGHER, *Assistant Examiner.*